United States Patent [19]

Brecker et al.

[11] 4,256,618

[45] Mar. 17, 1981

[54] ANTIMONY MERCAPTOCARBOXYLIC ACID OR ESTER-MERCAPTOCARBOXYLIC ACID ESTER STABILIZERS FOR RIGID POLYVINYL CHLORIDE RESIN COMPOSITIONS

[75] Inventors: Lawrence R. Brecker, Brooklyn; Charles Keeley, Wantagh, both of N.Y.

[73] Assignee: Argus Chemical Corporation, Brooklyn, N.Y.

[21] Appl. No.: 5,931

[22] Filed: Jan. 24, 1979

[51] Int. Cl.³ .............................................. C08L 91/00
[52] U.S. Cl. ........................ 260/23 XA; 260/45.75 B; 260/45.85 R; 260/45.95 R; 252/406
[58] Field of Search .................. 260/23 XA, 45.75 B, 260/45.85 R, 45.95 R; 252/406

[56] References Cited

U.S. PATENT DOCUMENTS

| 3,887,508 | 6/1975 | Dieckmann | 260/23 XA |
|---|---|---|---|
| 4,029,618 | 6/1977 | Dieckmann | 260/23 XA |

FOREIGN PATENT DOCUMENTS 771857  4/1957  United Kingdom .

*Primary Examiner*—Donald E. Czaja
*Assistant Examiner*—W. Thompson

[57] ABSTRACT

Stabilizer compositions for rigid polyvinyl chloride resin compositions are provided comprising an antimony mercaptocarboxylic acid or ester and a mercaptocarboxylic acid ester in amounts within the range from about 90 to about 25 parts antimony mercaptocarboxylic acid or ester and from about 10 to about 75 parts mercaptocarboxylic acid ester; the amount of mercaptocarboxylic acid ester being selected within these ranges to synergize the stabilizing effectiveness of the antimony mercaptocarboxylic acid or ester.

Rigid polyvinyl chloride resin compositions also are provided having their resistance to the development of early discoloration enhanced by a stabilizing amount of the antimony mercaptocarboxylic acid or ester and mercaptocarboxylic acid ester, the synergistic effect being particularly evidenced in rigid polyvinyl chloride resin compositions containing both an ortho-dihydric phenol and an alkaline earth metal carboxylate, such as catechol and calcium stearate.

27 Claims, No Drawings

ANTIMONY MERCAPTOCARBOXYLIC ACID OR ESTER-MERCAPTOCARBOXYLIC ACID ESTER STABILIZERS FOR RIGID POLYVINYL CHLORIDE RESIN COMPOSITIONS

Polyvinyl chloride resin compositions used for the manufacture of rigid articles such as pipe and profiles are processed nowadays by extrusion in multi-screw extruders. Multi-screw extruders differ from the older single-screw extruders, calenders and blow-molding machines in retaining the polyvinyl chloride resin composition being processed for a much shorter period of time. Such polyvinyl chloride resin compositions are usually pigmented, and they are also highly lubricated, by virtue of the addition of substantial amounts of lubricants such as waxes, mineral oil, and calcium stearate, so that under the positive displacement pumping action of the multi-screw extruder they can be processed at any desired rate.

Thus, the polyvinyl chloride resin compositions may not be subjected to the rather elevated temperatures, of the order of 375° F. and higher, required to bring the composition to an extrudable, softened condition, for much longer than thirty minutes, and frequently only for as little as five to ten minutes.

Conventional heat stabilizer compositions are not suited for use with such rigid polyvinyl chloride resin compositions. The highly lubricated compositions that are especially formulated for extrusion in such machines do not require stabilization against long heating times at 375° F. What is required, especially for light-colored compositions, is resistance to the development of any significant discoloration during the first five to ten or twenty minutes of heating, so as to avoid change in the color. Such discoloration is referred to as "early yellowing", or "early discoloration".

This discoloration conventional heat stabilizers are not generally formulated to prevent. While long term heat stability has been a prerequisite an early discoloration could be tolerated, if it did not deepen significantly with continued heating, since the art tolerated some discoloration, but in order to avoid degradation in physical properties during long term heating.

The highly lubricated formulations that have been developed for extrusion in these machines contain substantial quantities of lubricants, such as calcium stearate, frequently more lubricant than stabilizer. Typically from 0.6 to 1 part per hundred, and sometimes as much as two parts per hundred of lubricant, are used with from 0.3 to 0.5 part per hundred of an organotin stabilizer containing 12% tin or less. Such proportions are to be contrasted with the proportions used in conventional extrudable compositions for use with single-screw extruders, where from 1 to 1.5 parts per hundred of stabilizers containing 18% tin or 21 to 26% tin is used with a maximum of about 0.5 part per hundred of the lubricant. Since the most popular lubricant has been calcium stearate, the change in relative proportions has meant a considerable change in the tin/calcium ratio.

Moreover, since calcium stearate has a tendency to impart a yellow discoloration of its own, the prevention of early yellowing in such highly lubricated extrudable formulations has become correspondingly more difficult.

The organotin mercaptocarboxylic acid esters are widely recognized as the most effective organotin stabilizers, having a tin content of about 18% Sn. The position of the organotin mercaptocarboxylic acid esters has been challenged in recent years by the provision of stabilizers containing a higher proportion of tin, from about 21 to about 26% Sn, referred to as "high efficiency" organotins. The latter are exemplified by the organotin mercaptocarboxylic acid ester sulfides of U.S. Pat. Nos. 3,565,930, 3,565,931, 3,632,538 and 3,817,915. However, a high tin content is not a determinative factor in preventing the development of early discoloration, as exemplified by the organotin sulfides, which offer the highest tin and sulfur content per organotin group, and yet are not the most effective in this respect, affording a poor initial color, particularly.

While there are organotin stabilizers which are capable of lessening or inhibiting early discoloration, in recent years the organotins have become extremely expensive, and in short supply, with the result that the low cost products such as pipe and profiles have not been able to bear the cost of such stabilizers, and the art has had to turn to substitute systems, which are less expensive.

Stabilizer systems based on antimony compounds are less expensive, but, however formulated, have not been capable of inhibiting the development of a yellow discoloration during the first five or ten minutes of heating. The yellow discoloration has been sufficiently intense, after only ten minutes of heating, that such stabilizer systems despite their lower cost have not been competitive with organotin systems. Antimony-based stabilizers have also been characterized by poor storage life, with the formation of red, orange or black precipitates (presumably antimony sulfides and metallic antimony, respectively) known to occur. Moreover, polyvinyl chloride compositions stabilized with antimony-based stabilizers have had a greater tendency to discolor on exposure to sunlight than similar compositions with stabilizers not based on antimony.

A number of patents have suggested the use of antimony compounds, particularly sulfur-containing compounds such as the antimony mercaptides. These include U.S. Pat. Nos. 2,680,726, 2,684,956, 3,340,285, 3,999,220, 3,466,261 and 3,530,158. These patents disclose various types of organic sulfur-containing antimony compounds, but none have been adequate in inhibiting the development of an early yellow discoloration, in the processing of rigid polyvinyl chloride resin compositions.

Weinberg, Johnson and Banks U.S. Pat. No. 2,680,726 patented June 8, 1954 suggested the use of antimony mercaptocarboxylic acid esters of the formula $Sb(SRCO_2R')_3$, where R is alkylene, arylene or aralkylene and R' is a substituted or unsubstituted alkyl or mixed alkyl-aryl group. Among the compounds named are $Sb(SCH_2CO_2C_9H_{19})_3$ a mobile slightly yellow liquid; Sb-S,S',S"-tris(octadecyl thiomalate); $Sb(SCH_2CO_2C_{10}H_{21})_3$; Sb-S,S',S"-tris(glyceryl monoricinoleate-monomercaptoacetate) and Sb-S,S',S"-tris(dihydroabietyl mercaptoacetate).

German Pat. No. 1,114,808 to Deutsche Advance proposed antimony compounds of the formula $(XS)_2SbS(CH_2)_xCOO-A-COO(CH_2)_xSSb(SX)_2$, where x is an integer from 1 to 4; A an alkylene residue of up to ten carbon atoms, with or without OH groups, or merely a bond, and SX is the residue (having from eight to eighteen carbon atoms) of an aliphatic or aromatic mercaptan, or of an ester of a thioalcohol or thio acid, as stabilizers for polyvinyl halide resins.

Chemische Werke Barlocher British Pat. No. 1,194,414, published June 10, 1970, suggested antimony compounds of the formula:

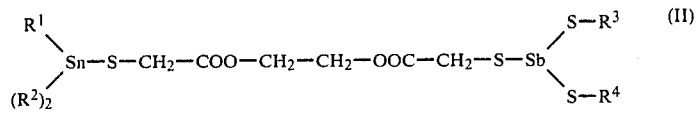

wherein $R^1$ is an organic group (which may contain tin and/or antimony atoms) which is linked to the tin atom via a carboxylic group or a thio group and is the radical of an aliphatic carboxylic acid having at least 4 carbon atoms or of a mercaptan;

$R^2$ is an alkyl radical;

$R^3$ and $R^4$ are organic groups linked to the sulphur atom via a carbon atom and are together with the sulphur atom radicals of mercapto compounds; and

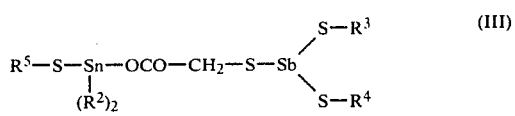

wherein $R^5$ is an organic group (which may contain tin and/or antimony atoms) which is linked to the sulphur atom via a carbon atom;

$R^2, R^3$ and $R^4$ have the designations assigned to them in formula II.

These are mixed compounds containing both antimony and tin in the molecule.

East German Pat. No. 71,360 patented Feb. 20, 1970 suggested antimony mercaptocarboxylate esters such as Sb-tris(2-ethylhexyl thioglycolate), used together with the corresponding organotin mercapto carboxylic ester.

Dieckmann, U.S. Pat. No. 3,887,508, patented June 3, 1975, has suggested that the stabilizing effectiveness of such antimony compounds can be improved by combining them with a metal carboxylate. Dieckmann proposed that antimony sulfur-containing compounds of the general formula $Sb(SR)_3$ (where R is a hydrocarbon or substituted hydrocarbon radical; SR the residue of a mercaptan or mercapto alcohol or a mercapto carboxylic acid ester) be improved by combining therewith an alkali metal or alkaline earth metal salt of monocarboxylic and dicarboxylic acids of the type $(RCXX)_n M$ wherein the group RCXX is the carboxylate and/or thiocarboxylate group of an aliphatic or aromatic mono or polyfunctional acid containing, for example, about $C_2$–$C_{54}$ carbon atoms; R is a hydrocarbon or substituted hydrocarbon radical; X is oxygen and/or sulfur; n is an integral number from 1–2 and M is an alkali or alkaline earth metal, for example, sodium, potassium, lithium, magnesium, calcium, strontium and barium. This class of course includes calcium stearate. According to Dieckmann, such combinations exhibit a synergism in long term heat stability, in comparison with a standard resin formulation containing neither antimony organic compound nor metal carboxylate. The results in the working Examples, for instance, Table II, column 7, are reported in terms of the length of time required for the resin composition to develop the same degree of discoloration as a control composition without either stabilizer after ten minutes of heating. There is no consideration given nor any report of the effectiveness of the stabilizer combinations in preventing the development of early discoloration, including the yellow discoloration imparted by the metal carboxylate.

In fact, these compositions are not capable of preventing the development of early discoloration. The metal carboxylate continues to contribute to early discoloration, just as it does in the absence of the antimony compound. Not only does it not enhance the effectiveness of the antimony compound in this respect; it worsens it. Compositions containing the antimony compound and the metal carboxylate develop a more intense yellow discoloration after the first five or ten minutes of heating than the antimony compound taken alone, although the long term stability may be extended.

Phenolic antioxidants, especially hindered phenols, have long been known as stabilizers for polyvinyl chloride resin compositions, particularly when used in combinations with other stabilizers. One of the first disclosures of the use of hindered phenols for this purpose is in U.S. Pat. No. 2,564,646, patented Aug. 14, 1951 to William E. Leistner, Arthur C. Hecker and Olga H. Knoepke. The effectiveness of phenols is discussed in the Encyclopedia of Polymer Science and Technology Volume 12 (1970), page 752. A problem with phenols is their tendency to impart a yellow discoloration to the compound on their own, which puts them in the category of calcium stearate; the result is an initial yellow discoloration which remains during the initial stages of heating, and then worsens. This of course disqualifies them; they are incapable of preventing the development of an early discoloration.

Dieckmann U.S. Pat. No. 4,029,618, patented June 14, 1977 claims that the early color heat performance of antimony organic sulfur containing compounds is significantly improved if they are combined with ortho-dihydric phenols. Improvements in long term heat stability also are achievable, according to the patent, and in addition, the compositions are asserted to be liquids which are shelf-stable at ambient temperatures. Dieckmann points out that liquid antimony stabilizer compositions tend to deteriorate on standing, as observed by the formation and/or precipitation of solids in the liquid compounds, forming heterogeneous liquids, which increase the problems of measuring and mixing the antimony compounds into vinyl halide resins for stabilization. This problem, it is asserted, is overcome by incorporating the ortho-dihydric phenol with the liquid antimony stabilizer. In these combinations, metal carboxylates, and particularly calcium stearate, can also be incorporated to achieve the advantages of the previously issued Dieckmann Pat. No. 3,887,508.

While Dieckmann claims improvements in long term heat stability are achieved with these combinations, this has not been confirmed, at least for combinations utilizing antimony mercaptocarboxylic acids, esters and mixed acid esters. Attempts to duplicate Dieckmann's results have shown that while the ortho-dihydric phenol increases the resistance to the development of early discoloration during the first twenty minutes of heating at 375° F., the ortho-dihydric phenol reduces the resistance to the development of long term discoloration. After forty minutes of heating, the composition containing the ortho-dihydric phenol and antimony mercaptocarboxylic acid or ester is invariably much more intensely discolored than the composition containing the antimony mercaptocarboxylic acid or ester alone. The effect appears to be due to the phenol, and may involve some interaction with the antimony compound. The effect may not simply be an effect arising from instability of the polyvinyl halide resin, but may also involve instability of the phenol, or some delayed interaction at such elevated temperatures between the phenol and the antimony compound, which destroys the effectiveness of both as stabilizers for the polyvinyl halide resin.

Neither has it been possible to confirm the assertions of long-term shelf stability for the combinations of ortho-dihydric phenols and liquid antimony compounds, at least in the case of the antimony mercaptocarboxylic acids or esters. Such blends also develop precipitates on standing, in the same manner as the liquid antimony compounds described by Dieckmann which do not contain the ortho-dihydric phenols.

British Pat. No. 771,857 published Apr. 3, 1957 to Metal & Thermit Corporation proposes mercapto acid esters as stabilizers for chlorine-containing synthetic resin compositions, particularly vinyl halide resin compositions containing plasticizers, and states that the effectiveness of the mercapto acid esters may be increased considerably when used in conjunction with a secondary stabilizer. The mercapto acid esters are of the general type:

HSRCOOR' in which

R and R' are both substituted or unsubstituted alkyl, aryl or mixed aryl-alkyl radicals. Thus, R may be derived from mercaptoacetic, beta mercaptopropionic, thiomalic or thiosalicyclic acid. Similarly, R' may be derived from decanols, glycerol, glycol monoesters, dihydro-abietyl alcohol or phenoxyethanol.

The secondary stabilizers used with these mercapto acid esters include organotin compounds; the reaction products of organotin oxides with aldehydes or acids; and antimony trioxide, trialkyl and triaryl antimonites, and antimonyl compounds. The trivalent antimony compounds are said to be more effective than dibutyl tin compounds. When the mercapto acid esters are used in conjunction with the secondary stabilizers, a reaction may take place therewith, but there is not enough of the secondary stabilizer to react completely with the mercapto acid ester, so that a mixture of any reaction product and the mercapto acid ester results.

The mercapto acid esters are preferably used in amounts within the range from about 0.25 to 2% by weight of the resin, and the secondary stabilizer is used in an amount within the range from 0.05 to 1% by weight of the resin. Of this proportion, the amount of mercapto acid ester consumed in the reaction with the secondary stabilizer of course reduces the amount of mercapto acid ester present, but to an indefinite extent, since the extent of the reaction is unknown. However, in all cases the amount of the secondary stabilizer is less than will consume all of the mercapto acid ester, which in effect imposes a prerequisite that in all cases the amount of mercapto acid ester exceeds the stoichiometrically reactive amount of secondary stabilizer.

In the Examples, all the resin compositions contained 50% plasticizer, dioctyl phthalate, and the amount of secondary stabilizer was quite small in proportion to the mercaptocarboxylic acid ester. Thus, in Example II, 1 part octadecyl mercaptoacetate was used with 0.05 part antimony trioxide. In Example VI, 0.25 part antimony trioxide was used with 1 part octadecyl mercaptoacetate. In Example VII, 0.1 part antimony trioxide was used with 1 part dihydroabietyl mercaptoacetate, and in Example VIII, 1 part glyceryl monoricinoleate monomercaptoacetate was used with 0.1 part antimony trioxide. In Example X, 0.1 part antimony trioxide was used with 1 part isooctomercaptoacetate. In Example XIV, 0.1 part antimony trioxide was used with 1 part dibutyl thiomalate. The data summarized in Tables I and II gives no suggestion of an effect on early discoloration for these Examples, since the first stage when the appearance is stated is after one hour of heating.

In accordance with the instant invention, it has been determined that a mercaptocarboxylic acid ester synergistically enhances the stabilizing effectiveness of antimony mercaptocarboxylic acids, esters and mixed acid esters in rigid polyvinyl chloride resin formulations in imparting resistance to the development of early discoloration when heated. The effectiveness of the two stabilizers together in imparting resistance to the development of early discoloration when heated is considerably greater than when either is used alone in the same total amount of stabilizer.

Further, it has been determined in accordance with the invention that the resistance of the rigid polyvinyl chloride resins to the development of early discoloration is further enhanced when the stabilizer composition contains an ortho-dihydric phenol and/or an alkaline earth metal carboxylate, suggesting a further synergistic interaction among these three or four stabilizers.

The synergistic interaction between the antimony mercaptocarboxylic acid or ester or mixed acid ester and mercaptocarboxylic acid ester appears to be unique to these components. A similar synergistic effect is not noted, for example, in combinations of mercaptocarboxylic acid esters with organotin compounds, such as dibutyl tin bis-(isooctyl thioglycolate) and other organotin mercaptocarboxylic acid esters, even when ortho-dihydric phenols and alkaline earth metal carboxylates are also included in such compositions.

Neither is the effect noted in the presence of a plasticizer. Rigid polyvinyl resin compositions are of course characterized by the presence of less than 10% plasticizer, and in most cases there is zero plasticizer present. Plasticized polyvinyl chloride resin compositions, on the other hand, contain upwards of 25% plasticizer in order to obtain a significant plasticizing effect, and normally the amount of plasticizer is in excess of 35%. The plasticized compositions of British Pat. No. 771,857, for example, all contained 50% or more plasticizer. Accordingly, the stabilizer systems of the present invention are used with rigid polyvinyl chloride resin compositions containing less than 10% plasticizer.

The invention further provides rigid polyvinyl chloride resin compositions suitable for extrusion in multi-screw extruders and having an enhanced resistance to the development of early discoloration when heated at 375° F., comprising a polyvinyl chloride resin, an antimony mercaptocarboxylic acid or ester, a mercaptocarboxylic acid ester, an ortho-dihydric phenol, and optionally, an alkaline earth metal carboxylate, epoxidized triglyceride ester, or both. Preferred for use in such polyvinyl chloride resin compositions are blends of antimony mercaptocarboxylic acid or ester and ortho-dihydric phenol which have been heated at an elevated temperature of at least about 50° C. for at least fifteen minutes. To such reaction products there can also be added an alkaline earth metal carboxylate and/or epoxidized triglyceride ester.

The stabilizer compositions of the invention contain as the principal stabilizing component antimony mercaptocarboxylic acids or esters having the general formula:

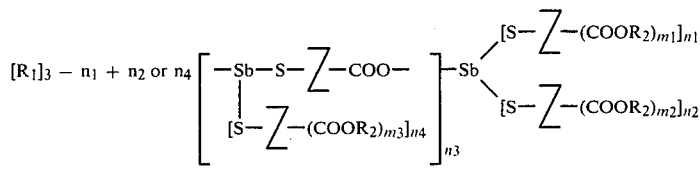

in which (1) $R_1$ is selected from the group consisting of organic groups of the formula —$SR_3OH$ and —$OR_3SH$, where $R_3$ is alkylene having from two to about eight carbon atoms; and S—Z—$(COOR_2)_m$ groups;

(2) $R_2$ is selected from the group consisting of hydrogen, alkyl, alkylene, alkenyl, aryl, arylene, mixed alkyl-aryl, mixed aryl-alkyl, cycloaliphatic, and heterocyclic containing one or more sulfur, oxygen or nitrogen ring atoms and having from about one to about twelve carbon atoms, and such groups containing ester groups, alkoxy groups, hydroxyl groups, and halogen atoms;

(3) S—Z—$COOR_2$ is a mercaptocarboxylic acid or ester group;

(4) $n_1$, $n_2$ and $n_4$ are the number of S—Z—$COOR_2$ groups, and are integers from 0 to 2; but at least one of $n_1$ and $n_2$ is 1 or 2;

(5) $n_3$ is the number of

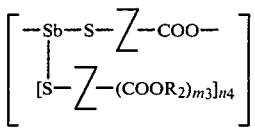

groups, and is a number from 0 to 10, and preferably from 0 to 1;

(6) $m_1$, $m_2$ and $m_3$ are the number of $COOR_2$ groups, and are integers from 1 to 6;

(7) Z is selected from the group consisting of bivalant alkylene radicals having from one to about five carbon atoms, carrying the S group in a position $\alpha$ or $\beta$ to a $COOR_2$ group; and such radicals containing free carboxylic acid, carboxylic ester, and carboxylic acid salt groups and mercapto groups.

The —S—Z—$(COOR_2)_m$ and —S—Z—COO— groups are derived from mono- or poly- $\alpha$-and $\beta$-mercapto carboxylic acids and esters by removal of the hydrogen atom of the mercapto group. The S—Z—($COOR_2)_m$ and —S—Z—COO— groups can be the same or different in the antimony compound, and the former if different can be all acid ($R_2$=H), all ester ($R_2$=other than H), or mixed acid and ester groups. The groups include the aliphatic acids and esters which contain at least one mercapto group, such as, for example, mercaptoacetic acid, $\alpha$- and $\beta$-mercaptopropionic acid, $\alpha$- and $\beta$-mercaptobutyric acid, $\alpha$- and $\beta$-mercaptovaleric acid, $\alpha$- and $\beta$-mercaptohexanoic acid, thiomalic acid, $\alpha$- and $\beta$-mercaptoadipic acid, and $\alpha$- and $\beta$-mercaptopimelic acid, and the $R_2$ esters of each of these.

Preferably, $R_2$ is either hydrogen or is derived from a monohydric alcohol containing from one to about fifteen carbon atoms, such as methyl, ethyl, propyl, s-butyl, n-butyl, t-butyl, isobutyl, octyl, isooctyl, 2-ethylhexyl, 2-octyl, decyl, lauryl, and myristyl; cyclic monohydric alcohols, such as cyclopropanol, 2,2-dimethyl-1-cyclopropanol, cyclobutanol, 2-phenyl-2-cyclobutanol, cyclopentanol, cyclohexanol, 2-methyl-, 3-methyl-, and 4-methylcyclopentanol and 2-methyl, 3-methyl-and 4-methyl-cyclohexanol, 2-phenylcyclohexanol, 3,3,5-tri-methyl cyclohexanol, cycloheptanol, 2-methyl-3-methyl-and 4-methyl-cycloheptanol, cyclooctanol, cyclononanol, cyclodecanol, cyclododecanol, or from a dihydric alcohol, such as glycols containing from two to about fifteen carbon atoms, including ethylene glycol; propylene glycol; diethylene glycol; di-propylene glycol; tetramethylene glycol; neopentyl glycol and decamethylene glycol; 2,2,4-tri-methylpentane-diol; 2,2,4,4-tetramethyl cyclobutane-diol; cyclohexane-1,4-dimethanol; and polyols such as glycerine, trimethylolethane, mannitol, sorbitol, erythritol, dipentaerythritol, pentaerythritol, and trimethylol propane.

The antimony mercaptocarboxylic acid esters in accordance with the invention are mostly known compounds, and can be prepared by known reaction procedures. One procedure employs antimony oxide, which is reacted with the corresponding mercaptocarboxylic acid or ester or mixture thereof. Another procedure employs antimony trichloride and alkali, which are reacted with the corresponding mercaptocarboxylic acid or ester or mixture thereof. If the acid is used, polymers containing the repeating unit

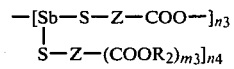

can be and probably are formed. These procedures are illustrated in Examples I to V.

The other essential ingredient of the stabilizer system in accordance with the invention is a mercaptocarboxylic acid ester having the formula

[$R_1COOR_2$]SH wherein $R_1$ and $R_2$ are hydrocarbon radicals selected from the group consisting of aliphatic, cycloaliphatic and aromatic hydrocarbon radicals, the aliphatic radicals having from one to about twenty carbon atoms, the cycloaliphatic radicals having from three to about twenty carbon atoms, and the aromatic radicals having from six to about twenty carbon atoms.

The SH group can be attached to either $R_1$ or to $R_2$. When the SH is attached to $R_1$, the compounds are esters of mercaptocarboxylic acids. When the SH is attached to $R_2$, the compounds are carboxylic acid esters of mercaptoalcohols. Both are referred to generically herein by the term "mercaptocarboxylic acid esters", which therefore encompasses both.

Exemplary aliphatic $R_1$ and $R_2$ radicals include methyl, ethyl, propyl, secondary butyl, N-butyl, tertiary butyl, isobutyl, octyl, isooctyl, 2-ethylhexyl, tertoctyl, decyl, lauryl, myristyl, stearyl and eicosyl.

Exemplary cycloaliphatic groups include cyclopropyl, cyclobutyl, cyclopentyl, cyclohexyl, cycloheptyl, cyclooctyl, and cyclododecyl, and hydrocarbon-substituted such cycloaliphatic radicals, including methyl cycloheptyl, ethyl cyclopentyl, nonyl cyclohexyl, dibutyl cyclohexyl, methyl cycloheptyl and ethyl cycloctyl.

Exemplary aromatic hydrocarbon radicals include phenyl, xylyl, tolyl, mesityl, ethyl phenyl, diethyl phenyl, nonyl phenyl, dodecyl phenyl, naphthyl, anthracyl, phenanthryl, alpha-methyl naphthyl, and beta-methyl naphtyl.

The mercaptocarboxylic acid esters can be derived from any of the mono- or poly-α- and β-mercaptocarboxylic acids and monohydric and dihydric alcohols and polyols referred to above at page 14, lines 1 to 26, in connection with the antimony mercaptocarboxylic acids or esters. The mercaptocarboxylic acids and esterifying alcohols in the antimony mercaptocarboxylic acids or esters and the mercaptocarboxylic acid esters can be the same or different. It can facilitate the preparation of both by reacting the mercaptocarboxylic acid and alcohol in stoichiometric amounts appropriate for the relative amounts of each, plus the antimony compound in stoichiometric amount for the antimony mercaptocarboxylic acid or ester.

When the mercaptocarboxylic acid ester is derived from a carboxylic acid and mercapto alcohol, this procedure cannot be used, and the antimony compound has to be prepared separately, since the antimony carboxylates of mercapto alcohols are not equivalent to the antimony mercaptocarboxylic acid or ester, and are not effective stabilizers.

The stabilizer system in accordance with the invention can also include an ortho-dihydric phenol. The effectiveness of this class of the ortho-dihydric phenols is unique, and not displayed by its isomers, the meta and para dihydric phenols, such as hydroquinone and resorcinol.

The class of ortho-dihydric phenols has the following general formula:

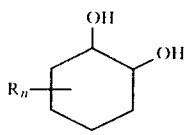

where:

R is selected from the group consisting of hydroxyl, alkyl, cycloalkyl, aryl, alkoxy, aryloxy, alkenyl, carboxylalkyl, carboxyaryl, acyl, aryl, alkenyloxy, hydroxyalkyl, hydroxyaryl, alkoxyaryl, and alkoxyalkyl having from one to about twelve carbon atoms; and n is an integer from zero to four.

Exemplary ortho dihydric phenols include catechol (which is preferred because of its cost and effectiveness), alkyl catechols such as p-t-butyl-catechol, p-methyl-cathechol, m-ethyl-catechol, alkoxy catechols such as p-methoxy catechol, p-propoxy-catechol, p-hexoxy-catechol, cycloalkyl catechols such as p-cyclohexyl-catechol, halogenated catechols such as m-chloro-catechol, p-chloro-catechol, p-bromo-catechol, polynuclear catechols such as p-phenyl catechol, α,β-dihydroxy naphthyl catechol, 2,2-di-(4,5-dihydroxyphenyl) propane and bis-(4,5-dihydroxy phenyl) methane.

As the alkaline earth metal carboxylate, there can be used alkaline earth metal salts of an aliphatic monocarboxylic acid having from about eight to about twenty-four carbon atoms. Such metal salts are widely used in the processing of polyvinyl chloride resins, particularly by extrusion, because of their lubricating characteristics. Exemplary alkaline earth metals are calcium, strontium and barium, and exemplary organic acids are lauric acid, 2-ethyl hexoic acid, undecylenic acid, capric acid, caproic acid, myristic acid, palmitic acid, stearic acid, oleic acid, linoleic acid, ricinoleic acid, linolenic acid, behenic acid and eicosanoic acid.

These acid salts are particularly advantageously prepared from the mixed fatty acids obtained by saponification of natural fats and waxes, such as coconut oil fatty acids, tallow fatty acids, montan wax fatty acids, castor oil fatty acids, corn oil fatty acids, fish oil fatty acids, sesame seed oil fatty acids, soya oil fatty acids, and tung oil fatty acids. Also useful are the partially saponified ester waxes, such as esters of montan was partially saponified with lime, and the synthetic aliphatic monocarboxylic acids.

Exemplary alkaline earth metal carboxylates that can be employed include calcium stearate, barium stearate, strontium stearate, calcium 2-ethylhexanoate, calcium oleate, barium oleate, calcium laurate, barium laurate, strontium caprylate, calcium palmitate, calcium caproate, and calcium eicosanoate, barium neodecanoate, barium octoate, strontium octoate, calcium decanoate and calcium undecanoate.

Mixtures of alkaline earth metal carboxylates can also be used, such as mixtures of barium and calcium stearate, barium and calcium octoate, barium and calcium oleate, barium and calcium myristate, and barium and calcium palmitate, as well as the calcium salts of coconut fatty acids, barium salts of coconut fatty acids, and strontium salts of tallow fatty acids.

Any of the metal carboxylates disclosed in U.S. Pat. Nos. 3,887,508 and 4,029,618 to Dieckmann can also be used.

Epoxidized triglyceride esters that can be used together with the antimony mercaptocarboxylic acid ester and mercaptocarboxylic acid ester blend, and homogeneously blended therewith, include any epoxidized previously ethylenically unsaturated fatty oils and fatty acid esters. Such oils and esters may have had one or more ethylenically unsaturated groups per molecule. Fatty oils, as is well known, are usually composed of varying proportions of glycerides of organic fatty acids including both saturated and unsaturated fatty acids, of which only the unsaturated groups have been epoxidized, the fatty acids having from about eight to about twenty-four carbon atoms.

Exemplary are epoxidized soyabean oil, epoxidized cottonseed oil, epoxidized beef tallow, epoxidized sheep tallow, epoxidized fish oils of various types, such as epoxidized menhaden oil, epoxidized cod liver oil, epoxidized shark oil, epoxidized sperm oil, epoxidized whale oil, epoxidized herring oil, epoxidized peanut oil, epoxidized linseed oil, epoxidized sunflower seed oil, epoxidized safflower seed oil, epoxidized coconut oil, epoxidized palm oil, epoxidized lard oil, epoxidized perilla oil, epoxidized palm kernel oil, epoxidized poppyseed oil, epoxidized rapeseed oil, epoxidized sesame seed oil, epoxidized hempseed oil, epoxidized cocoa oil, epoxidized acorn oil, epoxidized apricot kernel oil, epoxidized beechnut oil, epoxidized cherry kernel oil, and epoxidized corn oil, as well as epoxidized triglyceride esters mixed with epoxidized esters of the unsaturated fatty acids and monohydric and other polyhydric alcohols including epoxidized esters of oleic acid, linoleic acid, linolenic acid, ricinoleic acid, crotonic acid, and isocrotonic acid, with ethylene glycol, ethyl alcohol, pentaerythritol, butyl alcohol, mannitol, sorbitol, lauryl alcohol and stearyl alcohol.

The stabilizer system in accordance with the invention containing the antimony mercaptocarboxylic acid or ester or mixed acid ester, mercaptocarboxylic acid ester, and ortho-dihydric phenol can be prepared by simple blending of the ortho-dihydric phenol and antimony mercaptocarboxylic acid or ester and mercaptocarboxylic acid ester.

If desired, the ortho-dihydric phenol can be added to the reaction mixture in the course of preparation of the antimony mercaptocarboxylic acid or ester. The acid or ester can be obtained by reacting antimony oxide (or antimony trichloride and alkali) with the corresponding mercaptocarboxylic acid or ester. When ortho-dihydric phenol is present, the final reaction product contains the ortho-dihydric phenol reacted with the antimony mercaptocarboxylic acid or ester.

It is also possible to react antimony trioxide with the orthodihydric phenol in preparing the antimony phenolate of the type

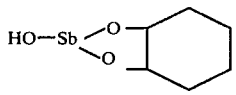

The antimony phenolate is then dissolved in either mercaptocarboxylic acid or ester, prior to reaction thereof with antimony trioxide or antimony trichloride and alkali, to form the antimony mercaptocarboxylic acid or ester, or the antimony phenolate can be dissolved directly in the antimony mercaptocarboxylic acid or ester, to prepare the stabilizer system.

The proportion of mercaptocarboxylic acid or ester and mercaptocarboxylic acid ester is within the range from about 90 to about 25 parts antimony mercaptocarboxylic acid or ester to from about 10 to about 75 parts of mercaptocarboxylic acid ester, and preferably within the range from about 40 to about 60 parts antimony mercaptocarboxylic acid or ester to from about 60 to about 40 parts mercaptocarboxylic acid ester. In all cases, the amount of mercaptocarboxylic acid ester is selected within the stated range to give an enhanced synergistic effect in imparting resistance to early discoloration, as compared to either antimony mercaptocarboxylic acid or ester, or mercaptocarboxylic acid ester, alone.

The proportion of the blend of antimony mercaptocarboxylic acid or ester or mixed acid ester and mercaptocarboxylic acid ester to orthodihydric phenol in the stabilizer systems of the invention can be within the range from about 100:1 to about 2:1, and preferably from about 50:1 to about 9:1.

The proportion of alkaline earth metal carboxylate to the blend of antimony mercaptocarboxylic acid or ester and mercaptocarboxylic acid ester can be within the range from about 10:1 to about 1:10, and preferably from about 3:1 to about 1:3.

The weight ratio of epoxidized triglyceride ester:-blend of antimony compound and mercaptocarboxylic acid ester can be within the range from about 10:1 to about 1:10 and preferably from about 3:1 to about 1:3.

The stabilizer systems in accordance with the invention can be used as stabilizers with any rigid polyvinyl chloride resin formulation. The term "polyvinyl chloride" as used herein is inclusive of any polymer formed at least in part of the recurring group

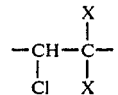

and having a chlorine content in excess of 40%. In this group, the X group can each be either hydrogen or chlorine. In polyvinyl chloride homopolymers each of the X groups is hydrogen. Thus, the term includes not only polyvinyl chloride homopolymers but also after-chlorinated polyvinyl chloride such as those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,984,593 to Isaksem et al, that is, syndiotactic polyvinyl chloride as well as atactic and isotactic polyvinyl chlorides.

The stabilizer systems of the invention are particularly useful with rigid polyvinyl chloride resin formulations. These are defined as containing no or only up to 10% plasticizer. Plasticizers which can be employed to impart an improved processability without impairing the rigidity of the formulation include dioctyl phthalate, dioctyl sebacate, and tricresyl phosphate. Where a plasticizer is employed, it can be used in an amount within the range from about 0.5 to about 10 parts per one hundred parts by weight of the resin.

Also useful plasticizers are the epoxy higher fatty acid esters having from about twenty to about one hundred fifty carbon atoms.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The total amount of stabilizer system in accordance with the invention is sufficient to impart the desired resistance to the development of early discoloration at working temperatures of 190° C. and above for at least ten minutes up to but not necessarily exceeding the first twenty to thirty minutes of heating. The more onerous the conditions to which the resin will be subjected during working, the greater will be the amount of stabilizer system required. Generally, as little as 0.1% total stabilizer by weight of the resin will improve the resistance of the development of early discoloration. There is no critical upper limit on the amount, but amounts above about 10% by weight of the resin do not give an increase in stabilizing effectiveness commensurate with the additional stabilizer employed. Preferably, the amount is within the range from about 0.25 to about 2% by weight of the resin.

Of this amount, from about 0.025 to about 9% by weight, preferably from about 0.05 to about 1.8% by weight, is antimony mercaptocarboxylic acid or ester; from about 0.01 to about 7.5% by weight, preferably from about 0.02 to about 1.5% by weight, is mercaptocarboxylic acid ester; from about 0.001 to about 1% by weight, preferably from about 0.01 to about 0.5% by weight, is ortho-dihydric phenol, if present; from about 0.1 to about 1.5% by weight is alkaline earth metal carboxylate, if present; and from about 0.1 to about 1.5% by weight is epoxidized triglyceride ester, if present.

The stabilizer of the invention is extremely effective when used alone, but it can be employed together with other polyvinyl chloride resin stabilizers, including organotin compounds, if special effects are desired. The stabilizer of the invention in this event will be the major stabilizer, and the additional stabilizer will supplement the stabilizing action of the former, the amount of the antimony mercaptocarboxylic acid or ester and mercaptocarboxylic acid ester stabilizer being within the range from about 0.1 to about 10 parts by weight per 100 parts of the resin, and the additional stabilizer being in the amount of from about 0.5 to about 5 parts per 100 parts of the resin.

Among the additional metallic stabilizers are included polyvalent metal salts of medium and high molecular weight phenols, with metals such as calcium, tin, barium, zinc, magnesium, and strontium. The nonmetallic stabilizers include organic phosphites, epoxy compounds (other than the triglycerides referred to above), polyhydric alcohols, and the like. Epoxy compounds are especially useful, and typical compounds are described in U.S. Pat. No. 2,997,454.

The stabilizer systems of this invention can be formulated for marketing by mixing the antimony mercaptocarboxylic acid or ester and mercaptocarboxylic acid ester or a previously prepared blend thereof, desirably after heating at an elevated temperature, will an inert diluent or with any liquid lubricant or plasticizer, in suitable concentrations ready to be added to the resin composition to give an appropriate stabilizer and lubricant or plasticizer concentration in the resin. Other stabilizers and stabilizer adjuncts can be incorporated as well.

The preparation of the polyvinyl chloride resin composition is easily accomplished by conventional procedures. The selected stabilizer combination is formed as described above, and then is blended with the polyvinyl chloride resin, or alternatively, the components are blended individually in the resin, using, for instance, a two or three-roll mill, at a temperature at which the mix is fluid and thorough blending facilitated, milling the resin composition including any plasticizer at from 250° to 375° F. for a time sufficient to form a homogeneous mass, five minutes, usually. After the mass is uniform, it is extruded in the usual way.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

The following Examples illustrate the preparation of the antimony compounds and blends thereof with ortho-dihydric phenols of the invention:

EXAMPLE I

Preparation of antimony tris-(isooctyl thioglycolate) from antimony oxide:

Into a five liter three-neck flask was put 1173.8 g (5.4 moles) of isooctyl thioglycolate, 93.85%. The isooctyl thioglycolate was heated to 40° C., and then there was gradually added 0.9 mole, 262.35 g, of antimony trioxide. Vacuum was applied, and heating continued to 70° C. at 29 mm of mercury. 0.5% Super-cel was added, and the reaction mixture was then filtered. The product assayed 16.4% antimony by atomic absorption spectroscopy, as compared to a theoretical of 16.67%.

EXAMPLE II

Preparation of antimony tris-(isooctyl thioglycolate) from antimony trichloride:

44.2 g purified antimony trichloride was mixed with 62.4 g isooctyl thioglycolate and 120 g of a 10% sodium hydroxide solution. The addition of sodium hydroxide was controlled to keep the temperature of the mixture within the range from 40°–50° C., and the pH not exceeding 6. After the addition, the mixture was stirred for one hour at 50° C., and allowed to separate. The upper antimony tris-(isooctyl thioglycolate) ester was collected, dried by heating and stirred at 50° C. under 20 mm of vacuum, and filtered. The dried product analyzed 15.9% antimony by atomic absorption spectroscopy.

EXAMPLES III and IV

Direct preparation of blends of catechol with antimony tris-(isooctyl thioglycolate) starting with antimony oxide:

III. Into a one liter three-neck flask was weighed 1.8 mole (367.2 g) of isooctyl thioglycolate, and this was then heated to 50° C. The addition of antimony trioxide was begun, at a rate to maintain the temperature of the reaction mixture between 70° and 75° C. The reaction was continued at a temperature in the range for one-half hour after all the antimony trioxide had been added, and the reaction mixture was then vacuum-stripped at 75° C. and 25 mm of mercury. Catechol 22.5 g was then added, and the mixture heated for three hours at 70° to 75° C. Ionol 30 g (2,6-di-tert-butyl p-cresol) was added, and dissolved by mixing for ten to fifteen minutes at 75° C. 114.0 g of epoxidized soya bean oil was then added, and the reaction mixture filtered.

IV. This procedure was repeated, with the difference that after the addition of catechol, the blend was heated for three hours at 110° to 115° C.

After three months storage at room temperature, the product of Example III, obtained by heating with catechol at 70° to 75° C., showed a precipitate, but the product of Example IV, which had been heated at 110° to 115° C. after addition of catechol, showed no precipitate. Thus, the use of the higher temperature gives a better product, since the product remains homogeneous at room temperature.

EXAMPLE V

Preparation of diantimony tetrakis-(isooctyl thioglycolate)-3-mercaptopropionate from antimony oxide:

Into a five liter three-neck flask was put 163.2 g (0.8 mole) of isooctyl thioglycolate, 93.85%, and 21.2 g (0.2 mole) 3-mercaptopropionic acid. The mixture was heated to 40° C., and then there was gradually added 58.3 g (0.2 mole) of antimony trioxide. Vacuum was applied and heating continued at 75° C. at 25 mm of mercury. The liquid was free of suspended matter and did not need to be filtered.

The reaction product was di-(antimony bis-(isooctyl thioglycolate))-3-mercaptopropionate, presumably having the formula:

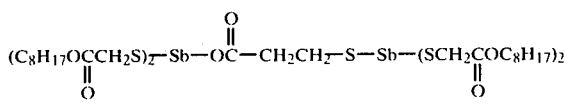

EXAMPLE VI

Direct preparation of blend of catechol with antimony tris-(isooctyl thioglycolate) starting with antimony oxide:

Into a one liter three-neck flask was weighed 1.8 mole (367.2 g) of isooctyl thioglycolate, and this was then heated to 50° C. The addition of antimony trioxide was begun, at a rate to maintain the temperature of the reaction mixture between 70° and 75° C. The reaction was continued at a temperature in the range for one-half hour after all the antimony trioxide had been added, and the reaction mixture was then vacuum-stripped at 75° C. and 25 mm of mercury. Catechol 22.5 g was then added, and the mixture heated for three hours at 70° to 75° C.

EXAMPLE VII

The following are further Examples of blends in accordance with the invention of antimony mercaptocarboxylic acids or esters, mercaptocarboxylic acid esters, and in some cases ortho-dihydric phenols, as well as blends prepared for comparison purposes without added mercaptocarboxylic acid esters. All blends were mixed together and then heated at from 75° to 80° C. for two hours.

| Blend | Parts by Weight | | | |
|---|---|---|---|---|
| | A | B | C | d |
| Antimony tris-(isooctyl thioglycolate) | 195 | 174 | 130 | 87 |
| Catechol | 11 | 11 | 11 | 11 |
| 2,6-di-t-butyl-cresol | 15 | 15 | 15 | 15 |
| Epoxy soybean oil | 57 | 57 | 57 | 57 |
| Isooctyl thioglycolate | 22 | 43 | 87 | 130 |
| Total | 300 | 300 | 300 | 300 |

| Blend | Parts by Weight | | | | | | | |
|---|---|---|---|---|---|---|---|---|
| | E | F | G | H | I | J | K | L |
| Antimony tris-(isooctyl thioglycolate) | 75 | 75 | 75 | 70 | 65 | 60 | 55 | 50 |
| 2-Mercaptoethyl laurate | 25 | — | — | — | — | — | — | — |
| 2-Mercaptoethyl tallate | — | 25 | — | — | — | — | — | — |
| Isooctyl thioglycolate | — | — | 25 | 30 | 35 | 40 | 45 | 50 |
| Total | 100 | 100 | 100 | 100 | 100 | 100 | 100 | 100 |

| Blend | Parts by Weight | | | | | |
|---|---|---|---|---|---|---|
| | M | N | O | P | Q | R |
| Antimony tris-(isooctyl thioglycolate) | 30 | 40 | 50 | 30 | 40 | 50 |
| Isooctyl thioglycolate | 70 | 60 | 50 | 70 | 60 | 50 |
| Catechol | 2 | 2 | 2 | 5 | 5 | 5 |
| Total | 102 | 102 | 102 | 105 | 105 | 105 |

| Blend | Parts by Weight | |
|---|---|---|
| | S | T |
| Antimony tris-(isooctyl thioglycolate) | 71.25 | 75 |
| 2-Mercaptoethyl ester of tall oil | 25 | — |
| 4-t-butyl catechol | 3.75 | 3.75 |
| Mineral oil | — | 21.75 |
| Total | 100 | 100 |

| Blend | Parts by Weight | | | | |
|---|---|---|---|---|---|
| | U | V | W | X | Y |
| Antimony tris-(isooctyl thioglycolate) | 50 | 50 | 50 | 50 | 50 |
| Isooctyl thioglycolate | 45 | 50 | 50 | 50 | 50 |
| Catechol | 2 | 2 | 2 | 2 | 2 |
| 3-Mercaptopropionic acid | — | 5 | 10 | — | — |
| Thioglycolic acid | — | — | — | 5 | 10 |
| Total | 97 | 107 | 112 | 107 | 112 |

The following Examples in the opinion of the inventors represent preferred embodiments of rigid polyvinyl chloride resin compositions incorporating the stabilizer systems in accordance with the invention:

EXAMPLES 1 and 2

A rigid, i.e., nonplasticized, polyvinyl chloride resin formulation was prepared having the following composition:

|  | Parts by Weight | | |
|---|---|---|---|
| Component | Control 1 | Example 1 | Example 2 |
| Polyvinyl chloride resin polymer (Geon 103 GP) | 100 | 100 | 100 |
| Titanium dioxide (pigment) | 2 | 2 | 2 |
| Wax 160 (160° F. m.p. paraffin) | 1 | 1 | 1 |
| Stabilizers | 0.75 | 0.67 | 0.60 |
| (1) Sb(SCH$_2$CO$_2$C$_8$H$_{17}$)$_3$ (Example I) | | | |
| (2) Isooctyl thioglycolate | — | 0.08 | 0.15 |

The stabilizers were mixed in the resin in the proportion indicated in the Table above on a two-roll mill to form a homogeneous sheet and sheeted off. Strips were cut from the sheet and heated in an oven at 190° C. for up to forty minutes. Strips of each composition were removed at five minute intervals, and affixed to cards, to show the progressive development of the discoloration. During the first fifteen to twenty minutes of heating early discoloration manifests itself. After twenty to thirty minutes of heating, long-term heat stability can be observed.

Control 1 contained only antimony tris-(isooctyl thioglycolate). Examples 1 and 2 contained antimony tris-(isooctyl thioglycolate) and added isooctyl thioglycolate in the amounts given, adding up to the same total amount.

The development of early discoloration is evaluated by the intensity of yellow tint formed, relative to the control, which contained no isooctyl thioglycolate. The results are shown in Table I.

TABLE I

| Time (minutes) | Control 1 | Example 1 | Example 2 |
|---|---|---|---|
| Initial | No discoloration | No discoloration | No discoloration |
| 5 | Very slight yellow discoloration | No discoloration | No discoloration |
| 10 | Significant yellow discoloration | No discoloration | No discoloration |
| 15 | Yellow discoloration and staining | Slight yellow discoloration | No discoloration |
| 20 | Yellow with dark stains | Yellow discoloration | Slight yellow discoloration |
| 25 | Yellow with dark stains | Yellow with dark stains | Yellow discoloration and staining |
| 30 | Dark tan | Yellow with dark stains | Yellow with dark stains |
| 35 | Dark tan | Dark tan | Dark tan |
| 40 | Dark tan | Dark tan | Dark tan |

It is apparent from the above results that the additional free isooctyl thioglycolate greatly enhanced the resistance of the resin composition to the development of yellow discoloration during the first fifteen minutes of heating. At the same time, the additional isooctyl thioglycolate does not worsen long term heat stability, and the overall stabilizer concentration is the same in all samples. These results demonstrate a synergistic interaction of antimony tris-(isooctyl thioglycolate) and added isooctyl thioglycolate.

EXAMPLES 3 to 6

Rigid, i.e., nonplasticized, polyvinyl chloride resin formulations were prepared having the following composition:

| Component | Parts by Weight |
|---|---|
| Polyvinyl chloride resin homopolymer (Diamond 40) | 100 |
| Titanium dioxide (pigment) | 2 |
| Calcium stearate | 0.6 |
| Wax 160 (160° F. m.p. paraffin) | 1 |
| Stabilizer blend of | 0.5 |
| (1) Sb(SCH$_2$CO$_2$C$_8$H$_{17}$)$_3$(Example II) | |
| (2) Additive (as shown in Table II) | 0.5 |

The stabilizer was mixed in the resin on a two-roll mill to form a homogeneous sheet, and sheeted off. Strips were cut from the sheet, heated in an oven at 375° F. to determine the onset of early discoloration during the first stages of heating, removed at five-minute intervals, and affixed to cards, to show the progressive development of the discoloration for the first twenty to thirty minutes. The effect on long term heat stability was determined by continuing the test for forty minutes.

The compositions of Controls 2 and 3 contained no isooctyl thioglycolate. Examples 3 to 6 contained antimony tris-(isooctyl thioglycolate), and isooctyl thioglycolate or other mercaptocarboxylic acid ester in the amounts given.

The development of early discoloration is evaluated by the intensity of yellow tint formed, relative to the controls. The results are shown in Table II.

TABLE II

190° C. OVEN TESTS

| | | Heat Stability | |
|---|---|---|---|
| Example No. | Additive | Early discoloration- time to first yellow (minutes) | Long term- time to first orange, red, or brown (minutes) |
| Control 2 | None | 5 | 20 |
| Control 3 | Mineral oil | 5 | 20 |
| Example 3 | Isooctyl thioglycolate | 10 | 30 |
| Example 4 | Isooctyl 3-mercapto-propionate | 10 | 30 |
| Example 5 | 2-Mercaptoethyl laurate | 15 | 35 |
| Example 6 | Ethylene glycol bis-(thioglycolate) | 15 | 35 |

It is apparent from the results in Table II that the effect of the calcium stearate (compared to Control 1 in Table I) is to impart a significant yellow discoloration, immediately after heating begins, and this intensifies as heating continues, so that the effect is always worse than without the calcium stearate through the first twenty minutes of heating. Examples 3 to 6, on the other hand, show an increased resistance of the development of yellow discoloration. In the presence of calcium stearate, the added mercaptoesters clearly increase the resistance to the development of early discoloration. This effect is quite surprising, inasmuch as in the absence of the added mercaptoester the effect of the calcium stearate is to intensify the yellow discoloration, not lessen it. Moreover, the effect is specific to added mercaptoesters, since addition of a hydrocarbon (mineral oil) had no such effect. Thus, the synergistic effect of added mercaptoesters with antimony tris-(isooctyl thioglycolate) operates both with and without calcium stearate.

EXAMPLE 7

A series of rigid, i.e., nonplasticized, polyvinyl chloride resin compositions were prepared having the following formulation:

| Component | Parts by Weight |
| --- | --- |
| Polyvinyl chloride resin homopolymer (Diamond 40) | 100 |
| Titanium dioxide (pigment) | 2 |
| Calcium stearate | 0.75 |
| Wax 160 (160° F. m.p. paraffin) | 1 |
| Metallic stabilizer (as shown in Table III) | 0.75 |
| Isooctyl thioglycolate (when present) | 0.75 |

The stabilizer was mixed in the resin in the proportion indicated on a two-roll mill to form a homogeneous sheet, and sheeted off. Strips were cut from the sheet and heated in an oven at 190° C. to determine the onset of early discoloration during the first stages of heating. Pieces of each strip were removed at five-minute intervals, and affixed to cards, to show the progressive development of the discoloration for the first twenty to thirty minutes. The effect on long term heat stability was determined by continuing the test for forty minutes.

The development of early discoloration was evaluated by the intensity of yellow tint formed and the long term stability was evaluated by the time to develop an orange, red, or brown discoloration.

The results obtained are shown in Table III.

TABLE III

190° C. OVEN TESTS

| | | Heat Stability | |
| --- | --- | --- | --- |
| Example No. | Metallic Stabilizer | Added isooctyl thioglycolate | Early discoloration- time to first yellow (minutes) | Long term- time to first orange, red, or brown (minutes) |
| Control 4 | $(C_4H_9)_2Sn(SCH_2CO_2C_8H_{17})_2$ | No | 5 | 30 |
| Control 5 | $(C_4H_9)_2Sn(SCH_2CO_2C_8H_{17})_2$ | Yes | 5 | 30 |
| Control 6 | $C_4H_9Sn(SCH_2CO_2C_8H_{17})_3$ | No | 15 | 25 |
| Control 7 | $C_4H_9Sn(SCH_2CO_2C_8H_{17})_3$ | Yes | 15 | 25 |
| Control 8 | $Sb(SCH_2CO_2C_8H_{17})_3$ | No | 5 | 25 |
| Example 7 | $Sb(SCH_2CO_2C_8H_{17})_3$ | Yes | 20 | 35 |

The results for Controls 5 and 7 vs. Controls 4 and 6 show that the addition of isooctyl thioglycolate has no effect on the well-known organotin mercaptocarboxylic acid esters, while antimony tris-(isooctyl thioglycolate) (Example 7 vs. Control 8) is so much improved by the added isooctyl thioglycolate as to be more effective than the costlier organotin mercaptides, with or without the added isooctyl thioglycolate.

EXAMPLE 8

A rigid, i.e., nonplasticized, polyvinyl choride resin formulation was prepared having the following composition:

| | Parts by Weight | |
| --- | --- | --- |
| Component | Control 9 | Example 8 |
| Vinyl chloride homopolymer (Geon 103 GP) | 100 | 100 |
| Titanium dioxide (pigment) | 2 | 2 |
| Wax 160 (160° F. m.p. paraffin) | 1 | 1 |
| Stabilizer | | |
| (1) Blend of Example VII - T | 1 | — |
| (2) Blend of Example VII - S | — | 1 |

The stabilizer was mixed in the resin in the proportion indicated on a two-roll mill to form a homogeneous sheet and sheeted off. Strips were cut from the sheet, heated in an oven at 190° C. for up to forty minutes, removed at five minute intervals, and affixed to cards, to show the progressive development of the discoloration. During the first fifteen to twenty minutes of heating early discoloration manifests itself. After twenty to thirty minutes of heating, long term heat stability can be observed.

The development of early discoloration was evaluated by the intensity of yellow tint formed. The results are shown in Table IV.

TABLE IV

190° C. OVEN TESTS

| | Heat Stability | |
| --- | --- | --- |
| Example No. | Early discoloration- time to first yellow (minutes) | Long term- time to first orange, red, or brown (minutes) |
| Control 9 | 15 | 25 |
| Example 8 | 25 | 40 |

The results for Control 9 vs. Example 8 show that the beneficial effect of 4-t-butyl catechol on the prevention of early yellowing (Control 9) is further enhanced by the presence of added 2-mercaptoethyl ester of tall oil fatty acid (Example 8), while at the same time long term heat stability is also much improved.

EXAMPLE 9

A rigid, i.e., nonplasticized, polyvinyl chloride resin formulation was prepared having the following composition:

| | Parts by Weight | |
| --- | --- | --- |
| Component | Control 10 | Example 9 |
| Vinyl chloride homopolymer (Geon 103 GP) | 100 | 100 |
| Titanium dioxide (pigment) | 2 | 2 |
| Calcium stearate | 0.62 | 0.62 |
| Wax 160 (160° F. m.p. paraffin) | 1 | 1 |
| Stabilizer | | |
| (1) Blend of Example VII - T | 0.5 | — |
| (2) Blend of Example VII - S | — | 0.5 |

The stabilizer was mixed in the resin in the proportion indicated on a two-roll mill to form a homogeneous sheet, and sheeted off. Strips were cut from the sheet, heated in an oven at 190° C. to determine the onset of early discoloration during the first stages of heating, removed at five minute intervals, and affixed to cards, to show the progressive development of the discoloration for the first twenty to thirty minutes. The effect on long term heat stability was determined by continuing the test for forty minutes.

The development of early discoloration was evaluated by the intensity of yellow tint formed.

The results are shown in Table V.

| | 190° C. OVEN TESTS | |
|---|---|---|
| | Heat Stability | |
| Example No. | Early discoloration-time to first yellow (minutes) | Long term-time to first orange, red, or brown (minutes) |
| Control 10 | 10 | 20 |
| Example 9 | 20 | 30 |

The results for Control 10 vs. Example 9 show that the beneficial effect of catechol on the prevention of early yellowing of formulations containing calcium stearate (Control 10) is further enhanced by the presence of added 2-mercaptoethyl tallate in the stabilizer blend (Example 9), while at the same time long term heat stability is also much improved.

Having regard to the foregoing disclosure, the following is claimed as inventive and patentable embodiments thereof:

1. A stabilizer composition capable of enhancing the resistance to the development of early discoloration in the first five to twenty minutes of heating at 190° C. of rigid polyvinyl chloride resin compositions, comprising an antimony mercaptocarboxylic acid or ester and a mercaptocarboxylic acid ester in the proportion of an amount within the range from about 25 to about 90 parts by weight antimony mercaptocarboxylic acid or ester and an amount within the range from about 75 to about 10 parts by weight mercaptocarboxylic acid ester, the amount of mercaptocarboxylic acid ester being selected within these ranges to synergize the stabilizing effectiveness of the antimony mercaptocarboxylic acid or ester.

2. A stabilizer composition according to claim 1, comprising, in addition, an ortho-dihydric phenol.

3. A stabilizer composition according to claim 2 in which the ortho-dihydric phenol has the formula:

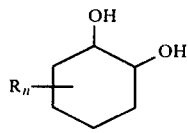

in which:
R is selected from the group consisting of hydroxyl, alkyl, cycloalkyl, aryl, alkoxy, aryloxy, alkenyl, carboxyalkyl, carboxyaryl, acyl, aryl, alkenyloxy, hydroxyalkyl, hydroxyaryl, alkoxyaryl, and alkoxyalkyl having from one to about twelve carbon atoms; and
n is an integer from zero to four.

4. A stabilizer composition according to claim 1, comprising, in addition, an alkaline earth metal carboxylate of a carboxylic acid having from about eight to about twenty-four carbon atoms.

5. A stabilizer composition according to claim 4 in which the alkaline earth metal carboxylate is calcium stearate.

6. A stabilizer composition according to claim 1, comprising, in addition, an epoxidized triglyceride ester of a carboxylic acid having from about eight to about twenty-four carbon atoms.

7. A stabilizer composition according to claim 1, in which the antimony mercaptocarboxylic acid or ester has the formula:

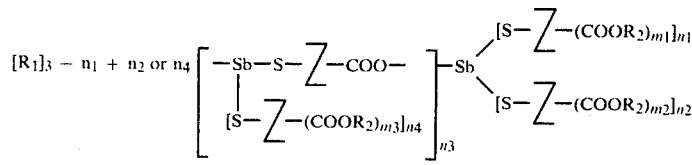

in which
(1) $R_1$ is selected from the group consisting of organic groups of the formula $-SR_3OH$ and $-OR_3SH$, where $R_3$ is alkylene having from two to about eight carbon atoms; and $S-Z-(COOR_2)_m$ groups;
(2) $R_2$ is selected from the group consisting of hydrogen, alkyl, alkylene, alkenyl, aryl, arylene, mixed alkyl-aryl, mixed aryl-alkyl, cycloaliphatic, and heterocyclic containing one or more sulfur, oxygen or nitrogen ring atoms, having from about one to about twelve carbon atoms, and such groups containing ester groups, alkoxy groups, hydroxyl groups, and halogen atoms;
(3) $S-Z-COOR_2$ is a mercaptocarboxylic acid or ester group;
(4) $n_1$, $n_2$ and $n_4$ are the number of $S-Z-COOR_2$ groups, and are integers from 0 to 2; but at least one of $n_1$ and $n_2$ is 1 or 2;
(5) $n_3$ is the number of

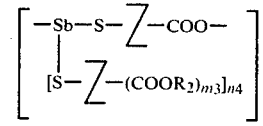

groups, and is a number from 0 to 10;
(6) $m_1$, $m_2$ and $m_3$ are the number of $COOR_2$ groups, and are integers from 1 to 6;
(7) Z is selected from the group consisting of bivalent alkylene radicals having from one to about five carbon atoms, carrying the S group in a position $\alpha$ or $\beta$ to a $COOR_2$ group; and such radicals containing free carboxylic acid, carboxylic ester, and carboxylic acid salt groups and mercapto groups.

8. A stabilizer composition according to claim 7 in which Z is $CH_2$.

9. A stabilizer composition according to claim 7 in which $R_2$ is a $C_8H_{17}$ group.

10. A stabilizer composition according to claim 7 in which $m_1$ is 1, $n_1$ is 3, and $n_2$ and $n_3$ are zero.

11. A stabilizer composition according to claim 1 in which the mercaptocarboxylic acid ester has the formula:

[R₁COOR₂] SH wherein
R$_1$ and R$_2$ are hydrocarbon radicals selected from the group consisting of aliphatic, cycloaliphatic and aromatic hydrocarbon radicals, the aliphatic radicals having from one to about twenty carbon atoms, the cycloaliphatic radicals having from three to about twenty carbon atoms, and the aromatic radicals having from six to about twenty carbon atoms; and the SH group can be attached to either R$_1$ or R$_2$.

12. A stabilizer composition according to claim 11 in which the SH is attached to R$_1$.

13. A stabilizer composition according to claim 11 in which the SH is attached to R$_2$.

14. A stabilizer composition according to claim 1, comprising the reaction product of the antimony mercaptocarboxylic acid ester and an ortho-dihydric phenol after heating at a temperature of at least 50° C. for at least fifteen minutes.

15. A stabilizer composition according to claim 1, comprising the reaction product of the antimony mercaptocarboxylic acid ester and ortho-dihydric phenol after heating at a temperature of at least 80° C. for at least fifteen minutes.

16. A rigid polyvinyl chloride resin composition comprising polyvinyl chloride and a stabilizing amount of a stabilizer composition according to claim 1.

17. A rigid polyvinyl chloride resin composition comprising polyvinyl chloride and a stabilizing amount of a stabilizer composition according to claim 2.

18. A rigid polyvinyl chloride resin composition comprising polyvinyl chloride and a stabilizing amount of a stabilizer composition according to claim 4.

19. A rigid polyvinyl chloride resin composition comprising polyvinyl chloride and a stabilizing amount of a stabilizer composition according to claim 6.

20. A rigid polyvinyl chloride resin composition comprising polyvinyl chloride and a stabilizing amount of a stabilizer composition according to claim 7.

21. A rigid polyvinyl chloride resin composition comprising polyvinyl chloride and a stabilizing amount of a stabilizer composition according to claim 11.

22. A rigid polyvinyl chloride resin composition comprising polyvinyl chloride and a stabilizing amount of a stabilizer composition according to claim 12.

23. A rigid polyvinyl chloride resin composition comprising polyvinyl chloride and a stabilizing amount of a stabilizer composition according to claim 13.

24. A rigid polyvinyl chloride resin composition in accordance with claim 16 in which the amount of stabilizer composition is within the range from about 0.25% to about 10% by weight of the composition.

25. A rigid polyvinyl chloride resin composition in accordance with claim 17 in which the amount of stabilizer composition is within the range from about 0.25% to about 10% by weight of the composition.

26. A rigid polyvinyl chloride resin composition in accordance with claim 16 including in addition a plasticizer for the resin in an amount up to about 10% by weight of the composition.

27. A rigid polyvinyl chloride resin composition in accordance with claim 17 including in addition a plasticizer for the resin in an amount up to about 10% by weight of the composition.

* * * * *

UNITED STATES PATENT AND TRADEMARK OFFICE
CERTIFICATE OF CORRECTION

PATENT NO. : 4,256,618
DATED : March 17, 1981
INVENTOR(S) : Lawrence R. Brecker et al It is certified that error appears in the above-identified patent and that said Letters Patent are hereby corrected as shown below:

| | | |
|---|---|---|
| Column 4, line 56 | : | "advatages" should be --advantages-- |
| Column 7, line 47 | : | "bivalant" should be --bivalent-- |
| Column 8, line 7 | : | "2-phenyl-2-cyclobutanol" should be --2-phenyl-1-cyclobutanol-- |
| Column 9, line 15 | : | "naphtyl" should be --naphthyl-- |
| Column 9, line 62 | : | "cathechol" should be --catechol-- |
| Column 10, line 22 | : | "was" should be --wax-- |
| Column 13, line 33 | : | after "and" insert --of-- |
| Column 16, line 19 | : | "d" should be --D-- |
| Column 16, line 42 | : | after "tall oil" insert --fatty acids-- |
| Column 18, line 9 | : | "$Sb(SCH)_2CO_2C_8H_{17})_3$" should be --$Sb(SCH_2CO_2C_8H_{17})_3$-- |

Signed and Sealed this

Seventh Day of January 1986

[SEAL]

Attest:

DONALD J. QUIGG

Attesting Officer

Commissioner of Patents and Trademarks